3,082,601
ROCKET COMBUSTION CHAMBER
Horst Witt, Schmiden, Kreis Waiblingen, Germany, assignor to Daimler-Benz Aktiengesellschaft, Stuttgart-Unterturkheim, Germany
Filed May 4, 1959, Ser. No. 810,872
Claims priority, application Germany May 8, 1958
3 Claims. (Cl. 60—35.6)

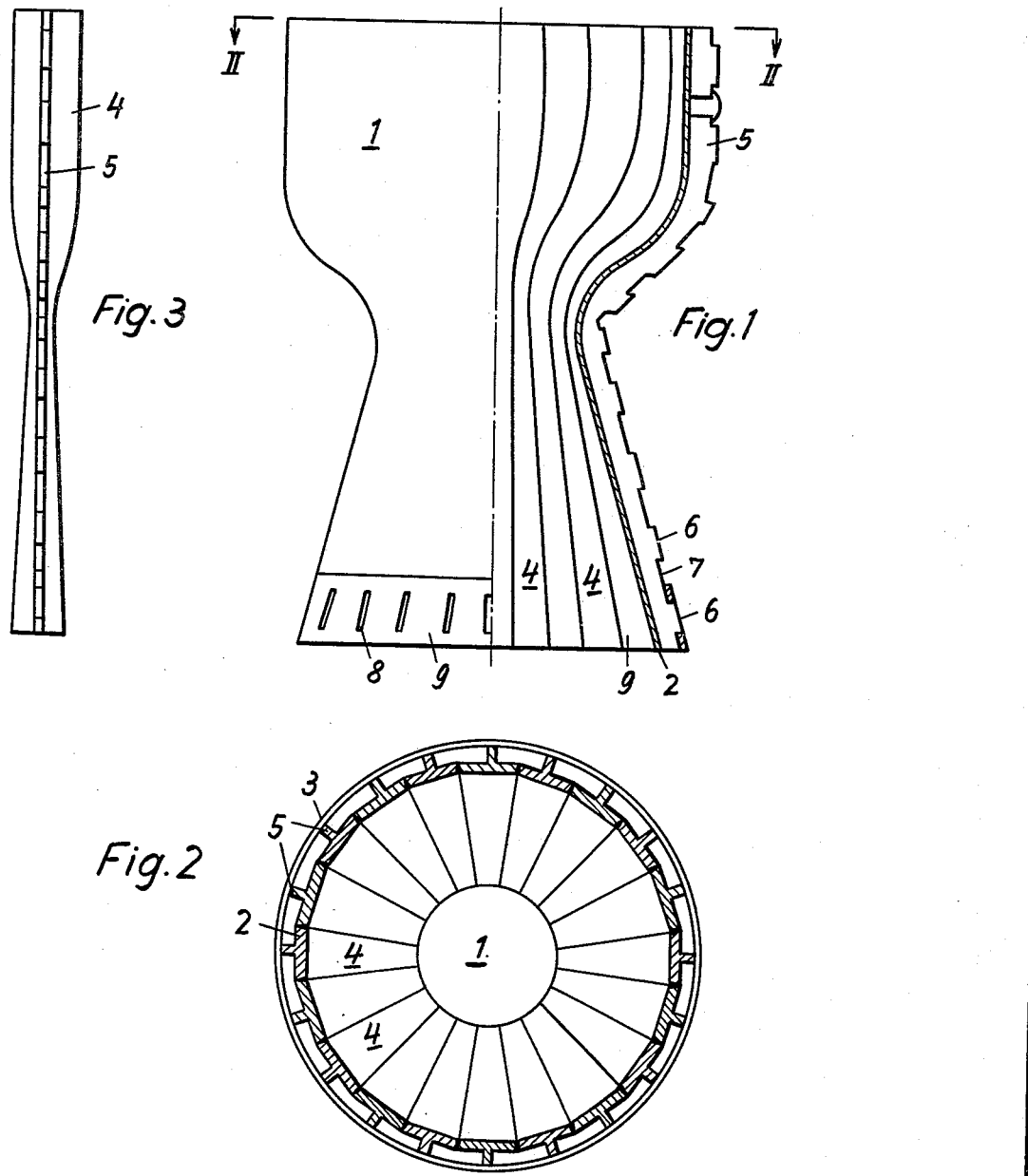

The present invention relates to improvements in rockets and more particularly to a rocket combustion chamber which is provided with an outer cooling jacket.

Because it its peculiar shape, it has in the past been very difficult to produce such a combustion chamber and the cooling jacket thereon. Prior to this invention, the combustion chamber and its nozzle-shaped end had to be made for economical reasons almost exclusively of straight circular cones or parts thereof. The assembly of these cones was a very difficult procedure and also required special frames and other appliances.

It is an object of the present invention to overcome the disadvantages of the previous methods of producing combustion chambers for rockets and to provide a new method which may be very easily and inexpensively carried out, permits the assembly of the individual parts of such a combustion chamber without requiring any special frames or other appliances, and also permits the combustion chamber to be built of any desired longitudinal cross-sectional shape without causing any substantial increase in the costs of production.

Another important object of the invention is to provide such a rocket combustion chamber which has a comparatively low weight and thereby improves the ascending qualities of the entire rocket.

For attaining these objects, the present invention essentially consists in producing the inner wall of the combustion chamber by assembling it of a plurality of structural elements which extend in the axial direction of the chamber, and which include means for maintaining the outer jacket at the proper distance from the inner wall and for bracing it relative thereto so that a plurality of cooling channels will be formed between the inner wall of the combustion chamber and the outer jacket. According to a preferred embodiment of the invention, these axially extending elements are made of a T-shaped cross section, wherein the central web of each element serves as a spacing member and also as a partition separating two adjacent cooling channels, each of which is thus formed by one of these central webs, the interconnected lateral arms of two adjacent T-shaped elements, and a section of the outer jacket.

A further object of the invention consists in assembling the outer jacket of a plurality of conical rings which are placed or wound around the outer ends of the spacing members which form integral parts of the inner wall of the combustion chamber. In order to attain a secure connection between the spacing members and the conical rings, it is advisable to provide the outer ends of the spacing members with suitable projections and the conical rings with corresponding apertures into which these projections engage and in which they may be secured to the conical rings, for example, by welding.

For taking up the thermal expansion of the material, expansion joints or the like may be provided between the conical rings and/or between the axially extending elements.

These and other objects, features, and advantages of the present invention will be further apparent from the following detailed description thereof, particularly when read with reference to the accompanying drawings, in which—

FIGURE 1 shows a side view, one-half in section, of a rocket combustion chamber according to the invention, but for a better illustration with only one conical ring thereon;

FIGURE 2 shows a cross section of the combustion chamber taken along line II—II of FIGURE 1; while FIGURE 3 shows a plan view of one of the axially extending structural elements of the combustion chamber according to FIGURES 1 and 2.

As illustrated in FIGURES 1 and 2, the rocket combustion chamber 1 according to the invention comprises a cylindrical part which merges into the further parts of the combustion chamber of the rocket body, namely, a nozzle-like constriction and an outwardly flaring diffuser part at the end of the combustion chamber. The entire chamber, therefore is of hour-glass shape. The inside of the combustion chamber is enclosed by an inner wall 2 which, in turn, is enclosed by an outer jacket 3.

According to the present invention, the inner wall 2 is composed of a plurality of structural elements 4 extending in the axial direction of the combustion chamber, one of which is illustrated in FIGURE 3. In the particular embodiment of the invention as shown in the drawings, each of these elements 4 has a substantially T-shaped cross section, the central web being indicated at 5. Each element 4, as illustrated in FIGURE 3, is hour-glass shaped in plan view to provide for the nozzle construction. The portion of element 4 connected to web 5 may be considered the headpiece of the T-shaped section. As shown in FIGURE 1, the outer edge of each web 5 is notched out to form projections 6 and recesses 7. The outer jacket 3 of the combustion chamber 1 consists of adjacent conical rings 9 which abut against each other, although only one of them is illustrated in FIGURE 1. The individual conical rings are provided with apertures 8 of a size corresponding to that of the projections 6 and adapted to receive these projections which are then welded to the walls of the apertures 8. The adjacent conical rings 9 and axial structural elements 4 are also welded to each other so that a closed inner wall 2 and a closed outer wall 3 is attained. The channels which are formed between the webs 5 are intended to serve as cooling channels.

The rocket combustion chamber according to the invention has the advantage of being produced and assembled much more easily and inexpensively than previously possible. The special frames and appliances which were hitherto necessary for producing such combustion chambers are no longer required since the conical outer rings themselves serve as a frame during the assembly by being first erected on top of each other, whereupon the axially extending elements 4 are inserted therein from the inside.

Although my invention has been illustrated and described with reference to the preferred embodiment thereof, I wish to have it understood that it is in no way limited to the details of such embodiment, but is capable of numerous modifications within the scope of the appended claims.

Having thus fully described my invention, what I claim is:

1. A rocket combustion chamber comprising an inner wall consisting of a plurality of relatively narrow, elongated members extending in the axial direction of said chamber each of said members having a substantially T-shaped cross-section formed by a central web and a head piece, the head pieces of said elongated members being rigidly secured together to form said chamber with the central webs thereof extending outwardly from said chamber, said central webs of said elongated members constituting integral spacing members, and an outer cooling jacket secured to said central webs and forming therewith a sealed cooling jacket surrounding said chamber, said cooling jacket consisting of a plurality of narrow conical rings mounted on said spacing members and secured thereto, said spacing members forming partitions separating the cooling chamber formed between said head pieces and said outer jacket into individual cooling channels, said conical rings being mounted on said spacing members extending traversely to said longitudinally extending members around the outer ends of said central webs at a distance from the inner wall, said conical rings having apertures therein, and said spacing members having projections on the outer ends thereof engaging into said apertures and secured to said rings.

2. A rocket combustion chamber as defined in claim 1, wherein the outer end of said projections engaging into said apertures is flush with the outer surface of said conical rings.

3. A rocket combustion chamber having a substantially hour-glass shape comprising a primary structural support element formed by a plurality of narrow individual elongated members extending longitudinally of said chamber in the axial direction thereof and for substantially the entire length thereof, each of said members having a substantially T-shaped cross section formed by a central web and a head piece, the head pieces of said elongated members being secured together with the central webs thereof extending outwardly to form a hollow elongated combustion chamber, said members being bent between the ends thereof inwardly with respect to the assembled chamber to thereby form a restriction in said chamber and define the hour-glass shape thereof, the head pieces of each of said members being of substantially hour-glass shape when viewed in plan view and forming the inner wall of said primary structural element with the narrowest portion of the hour-glass shape being approximately at the apex of the bent area of said members, and a cooling means including an outer jacket secured to the central webs of said members and spaced a distance from said inner wall, said central webs thereby forming spacer members and dividing the cooling means into a plurality of channels, said outer jacket consisting of a plurality of narrow conical ring elements having apertures therein, the outer ends of said central webs having projections thereon, said projections engaging into said apertures and securing said conical ring elements to said elongated members.

References Cited in the file of this patent

UNITED STATES PATENTS

| | | |
|---|---|---|
| 2,544,538 | Mahnken et al. | Mar. 16, 1951 |
| 2,844,939 | Schultz | July 29, 1958 |
| 2,919,549 | Haworth et al. | Jan. 5, 1960 |
| | (Corresponding British Patent 790,292, filed Jan. 27, 1955) | |
| 2,943,442 | Baehr | July 5, 1960 |
| 2,955,415 | Long | Oct. 11, 1960 |
| 2,976,679 | Dalgleish | Mar. 28, 1961 |

FOREIGN PATENTS

| | | |
|---|---|---|
| 790,292 | Great Britain | Feb. 5, 1958 |
| 1,019,865 | Germany | Nov. 21, 1957 |